Sept. 19, 1950  R. N. GUTH  2,522,611
BRAKE SPRING TOOL
Filed Aug. 25, 1948
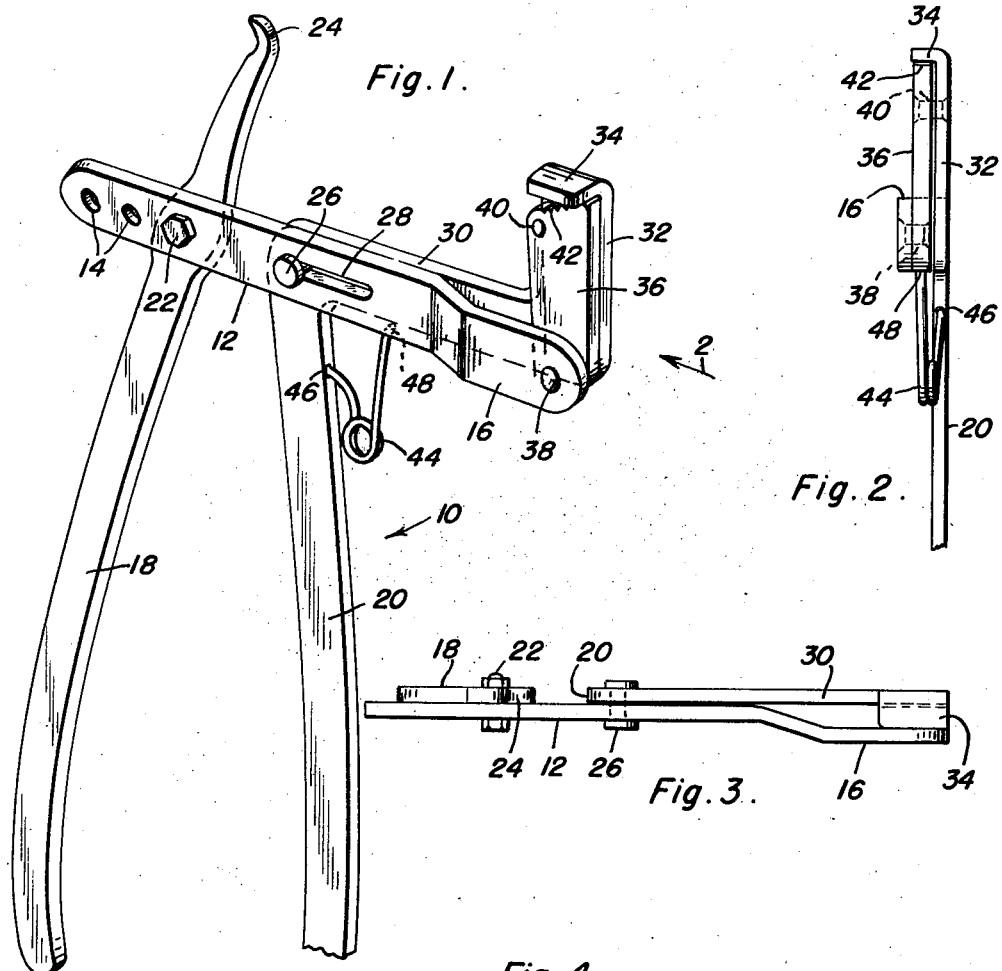
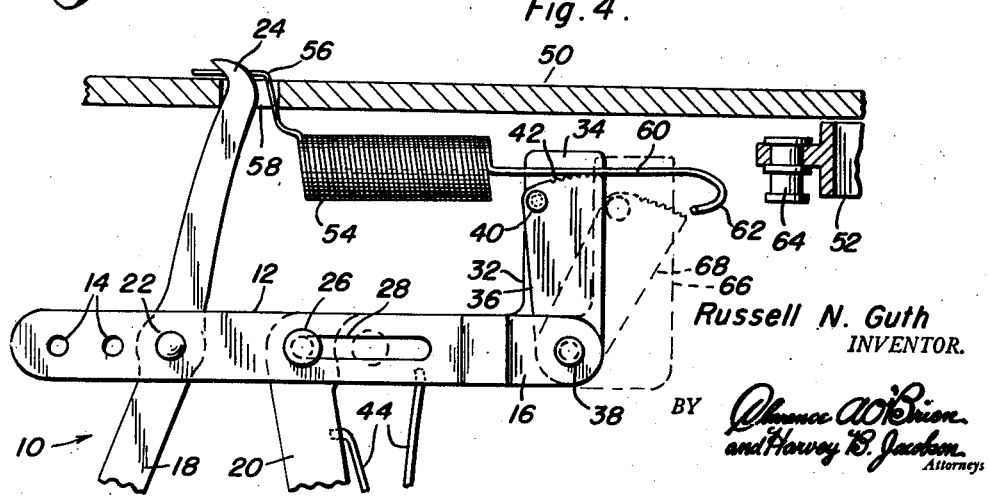
Russell N. Guth
INVENTOR.

Patented Sept. 19, 1950

2,522,611

UNITED STATES PATENT OFFICE 2,522,611

BRAKE SPRING TOOL

Russell N. Guth, Allentown, Pa.

Application August 25, 1948, Serial No. 45,998

4 Claims. (Cl. 29—227)

This invention relates to new and useful improvements and structural refinements in tools for automobile mechanics and the principal object of the invention is to facilitate application and removal of springs such as are commonly associated with brake shoes in hydraulic brakes on automobiles, trucks, and similar vehicles.

This object is achieved by the provision of a tool whereby the spring may be stretched as desired, so as to facilitate anchoring thereof to the brake shoe and the brake support, or to facilitate separation of the spring from the brake shoe and support, as the case may be.

An important feature of the invention resides in the provision of means for adjusting the tool to accommodate brake springs of different lengths.

Important advantages of the invention lie in its simplicity of construction, in its convenience of operation, and in its adaptability to economical manufacture.

With the above more important objects and features in view and such other objects and features that may become apparent as this specification proceeds, the invention consists essentially in the arrangement and construction of parts as illustrated in the accompanying drawings, in which:

Figure 1 is a perspective view of the invention, one of the handles thereof being partially broken away, Figure 2 is a fragmentary end view, taken substantially in the direction of the arrow 2 in Figure 1, Figure 3 is a top plan view of the invention, and Figure 4 is a fragmentary plan view of the invention applied to a brake spring and in readiness for use.

Like characters of reference are employed to designate like parts in the specification and throughout the several views.

Referring now to the accompanying drawings in detail, the invention consists of a brake spring applying and removing tool designated generally by the reference character 10, the same embodying in its construction a strap-like bar 12 provided at one end thereof with a row of apertures 14, while its remaining end portion is laterally offset, as indicated at 16.

A pair of handles 18, 20 are provided on the bar 12, these handles, for purposes of convenient identification, being designated as the primary handle 18 and the secondary handle 20. The primary handle 18 is equipped intermediately of its length with a pivot bolt or screw 22 which is selectively receivable in the apertures 14, so that the primary handle is adjustably pivoted, so to speak, to the bar 12, as will be clearly apparent.

It will be also noted that one end portion of the primary handle 18 terminates in a laterally angulated anchoring hook 24, the purpose of which will be hereinafter more fully described.

The secondary handle 20 is provided intermediately of its ends with a pivot pin or rivet 26 which is slidable in a longitudinally extending slot 28 with which an intermediate portion of the bar 12 is equipped, the secondary handle 20 being angulated as at 30 and as at 32, and terminating in an angulated spring-gripping jaw 34, as is best shown in Figure 1.

A further jaw 36 is pivoted, as at 38, to the offset end portion 16 of the bar 12, and is also pivoted, as at 40, to the angulated portion 32 of the handle 20. The jaw 36 is equipped adjacent the pivot 40 thereof with a set of gripping teeth 42 which are formed on what may be referred to as a cam-surfaced edge of the jaw and are adapted to coact with the aforementioned jaw 34.

A suitable coil spring 44 has one end portion 46 thereof anchored to the handle 20, while its remaining end portion is anchored to an intermediate portion of the bar 12, as indicated at 48.

Referring now to the accompanying Figure 4, the reference character 50 designates a portion of what is usually called a brake support, on which are provided outwardly expanding brake shoes, one of the latter being shown at 52. A compression spring 54 is usually employed for retracting the brake shoe 52 to its contracted position, one end portion 56 of this spring being anchored in an aperture 58 with which the support 50 is formed, while the remaining end portion of the spring assumes the form of a straight stem 60 terminating in a hook 62. This hook is engageable with a pin 64 provided on the brake shoe 52, and it will be apparent that the contracted spring must be stretched in order to facilitate its installation, and similarly, it must be stretched so as to facilitate disengagement thereof from the pin 64 when the spring is to be removed.

The installation and removal of the spring is facilitated by the instant invention which enables the spring to be stretched, this being effected by simply engaging the hook portion 24 of the handle 18 with the aperture 58 of the brake support 50, after the end portion 56 of the spring 54 has been inserted in the aperture 58, as shown in Figure 4. Thereupon, the stem portion 60 of the spring 54 is positioned between the jaw 34 and the teeth 42 of the jaw 36, and by simply pressing the handles 18, 20 together, the jaws 34, 36 will be caused to firmly grip the stem 60, while at the same time the jaws 34, 36 will be moved away from the hook 24 of the handle 18, substantially to positions indicated by the phantom lines 66, 68. In this manner, the spring 54 will be stretched sufficiently to facilitate engagement or disengagement of the hook 62 of the spring with the pin 64, and application or removal of the spring will be facilitated, as the case may be.

The function of the spring 44 is, of course, to return the jaws 34, 36 and the handles 18, 20 to their initial positions, while the slot 28 in the bar 12 facilitates sliding of the pivot 26 on the bar while the spring stretching operation is in progress.

Finally, it should be explained that the selective positioning of the pivot 22 in the apertures 14 will facilitate adjustment of the handle 18 with respect to the bar 12 so that the tool may accommodate springs (54) of different lengths.

It is believed that the advantages and use of the invention will be clearly apparent from the foregoing disclosure, and accordingly further description thereof at this point is deemed unnecessary.

Having described the invention, what is claimed as new is:

1. A spring applying and removing tool comprising a jaw support member having a first jaw thereon, an actuating member, one of said members having a slot therein, a pin on the other of said members slidably and pivotally received in said slot, a second jaw pivoted to said support and also pivoted to said actuating member, said second jaw having a clamping surface underlying said first jaw for clamping one end of a spring against the first jaw upon sliding movement of said actuating member relative to said support member, a lever pivotally attached to said actuating member and having a finger thereon for engaging and expanding a spring held by said first and second jaws.

2. A spring applying and removing tool comprising an actuating member, a jaw support member having a first jaw thereon, a handle provided on said jaw support member, one of said members having a slot therein, a pin on the other of said members slidably and pivotally received in said slot, a second jaw pivoted to said actuating member and also pivoted to said jaw supporting member, a wire engaging surface on said second jaw underlying said first jaw, a spring attached to said jaw support member and said actuating member yieldingly urging said second jaw out of wire engaging registry with said first jaw, a lever pivoted to said actuating member, a spring engaging finger on said lever, movement of said handle and said lever towards each other sequentially causing sliding of said jaw support member relative to said actuating member to move said second jaw into wire clamping registry with said first jaw and then causing spring stretching pivoting movement of said lever.

3. A spring applying and removing tool comprising a bar having a longitudinal slot therein, an L-shaped jaw suporting member having upper and lower arms, a handle on said lower arm, a pin attached to said lower arm slidably and pivotally received in said slot, a first jaw on said upper arm, a second jaw pivoted to said upper arm and also pivoted to said bar for clamping one end of a spring against the upper jaw upon sliding movement of said jaw supporting member relative to said bar, a spring attached to said handle and to said bar to yieldingly urge said second jaw out of wire engaging registry with said first jaw, a lever having a spring engaging finger on one end pivotally attached to said bar to selectively expand a spring attached at one end to said finger and engaged at its other end by said first and second jaws.

4. A spring applying and removing tool comprising a bar having end portions and a longitudinally extending slot intermediate said end portions, an L-shaped jaw support member including upper and lower arms, a handle on said lower arm, a pin attached to said lower arm and slidably and pivotally received in said slot, a first jaw on said upper arm extending transversely of the plane of said jaw support member, a second jaw having upper and lower ends, a first pivot pin connecting said lower end of said second jaw and one of said end portions of said bar, and a second pivot pin connecting said upper end of said second jaw to said upper arm, a wire engaging surface on said second jaw underlying said first jaw and selectively pivotal out of wire engaging registry with said first jaw, said slot having an edge arresting sliding movement of said jaw support member relative to said bars to limit closing movement of said second jaw relative to said first jaw, an actuating lever having upper and lower ends and pivotally attached intermediate its ends to the other of said end portions of said bar, and a spring engaging finger on the upper end of said lever, movement of said handle and said lever towards each other first causing sliding of said jaw supporting member relative to said bar to pivot said second jaw relative to said upper arm thereby locking one end of a spring between said first and second jaws, and then causing pivoting of said second lever to expand a spring engaged by said finger and clamped between said jaws.

RUSSELL N. GUTH.

REFERENCES CITED

The following references are of record in the file of this patent:

UNITED STATES PATENTS

| Number | Name | Date |
|---|---|---|
| 869,402 | Weyant | Oct. 29, 1907 |
| 1,017,147 | Hall | Feb. 13, 1912 |
| 1,157,223 | Holcomb | Oct. 19, 1915 |
| 1,483,821 | Maples | Feb. 12, 1924 |
| 1,862,326 | Altice | June 7, 1932 |
| 1,917,878 | O'Donnell | July 11, 1933 |
| 1,949,343 | Wood | May 18, 1937 |

FOREIGN PATENTS

| Number | Country | Date |
|---|---|---|
| 47,967 | France | May 18, 1937 |